US007913434B1

(12) United States Patent
Olaver

(10) Patent No.: US 7,913,434 B1
(45) Date of Patent: Mar. 29, 2011

(54) REUSABLE CALENDAR SYSTEM

(76) Inventor: Nancy A. Olaver, Chino Hills, CA (US)

( * ) Notice: Subject to any disclaimer, the term of this patent is extended or adjusted under 35 U.S.C. 154(b) by 0 days.

(21) Appl. No.: 12/370,109

(22) Filed: Feb. 12, 2009

Related U.S. Application Data

(60) Provisional application No. 61/027,881, filed on Feb. 12, 2008.

(51) Int. Cl.

| | |
|---|---|
| ***G09D 3/00*** | (2006.01) |
| ***B42D 5/04*** | (2006.01) |
| ***B42D 11/00*** | (2006.01) |
| ***B42D 12/00*** | (2006.01) |
| ***B42D 12/02*** | (2006.01) |
| ***G09B 27/08*** | (2006.01) |
| ***G09B 1/24*** | (2006.01) |
| ***G09B 25/00*** | (2006.01) |

(52) U.S. Cl. ................ 40/110; 40/107; 40/335; 40/657; 283/2; 283/3; 283/61; 283/62; 434/147; 434/197; 434/304; 434/428; 434/429

(58) Field of Classification Search .................... 40/107, 40/110, 657, 335; 283/61, 2, 3, 62; 434/147, 434/197, 304, 429
See application file for complete search history.

(56) References Cited

U.S. PATENT DOCUMENTS

| | | | | |
|---|---|---|---|---|
| 4,218,077 | A * | 8/1980 | Ember | 283/2 |
| 5,195,262 | A * | 3/1993 | Roane | 40/109 |
| 5,387,011 | A * | 2/1995 | Freund | 283/61 |
| 7,293,379 | B2 * | 11/2007 | Paulos | 40/107 |
| 2006/0059734 | A1 * | 3/2006 | Drie | 40/110 |

* cited by examiner

*Primary Examiner* — Lesley Morris
*Assistant Examiner* — Syed A Islam
(74) *Attorney, Agent, or Firm* — Kenneth L Tolar

(57) ABSTRACT

A calendar system comprising multiple (i.e., twelve) magnetic "month" sheets for each calendar month of the year, a magnetic "To Do List" sheet and a magnetic "Six Weeks at a Glance" sheet. Each sheet includes a header section that can variably depict the current month, year and/or day. The system further includes a plurality of magnetic "week" strips for securing to one of the sheets. Each "week" strip includes seven columns each having a day of the week imprinted adjacent thereto. Adjacent each day of the week indicia is a date space to which one of the numbered tabs is secured to appropriately label each day with the corresponding date for the particular week. A plurality of color-coded event tabs are also included for magnetically securing to one of the "week" strips positioned on a "Month" sheet or the "Six Weeks at a Glance" sheet, or directly to the "To Do List" sheet. Each time a week elapses, a "week" strip is moved from the current "Month" sheet to the "Six Weeks at a Glance Sheet." The week strip associated with the elapsed week is moved to a final "Month" sheet and re-labeled accordingly whereby next year's calendar is continuously configured and updated.

14 Claims, 3 Drawing Sheets

REUSABLE CALENDAR SYSTEM

CROSS REFERENCE TO RELATED APPLICATIONS

This application is entitled to the benefit of provisional application No. 61/027,881 filed on Feb. 12, 2008, the specification of which is incorporated herein by reference.

BACKGROUND OF THE INVENTION

The present invention relates to a unique calendar system wherein the calendar for the next twelve months is continuously reconfigured and updated.

DESCRIPTION OF THE PRIOR ART

Nearly everyone uses a calendar to memorialize important events such as birthdays, appointments and holidays. Calendars typically include bound pages each having month and day spaces appearing thereon on which a user transcribes the time and description of an important event. However, at the end of each calendar year, the existing calender must be replaced with a new calendar that corresponds to the new year. Repeatedly purchasing a new calendar is costly and burdensome. Furthermore, many important events recur each year thereby requiring the user to rewrite the event on a yearly or monthly basis, which is laborious and time consuming. Accordingly, there is currently a need for a calendar system that overcomes the above-enumerated disadvantages associated with conventional calendars.

A review of the prior art reveals a myriad of perpetual or reusable calendars. For example, U.S. published patent application no. 20080263917 filed on behalf of Kwon discloses a calendar configured to distinguish between a holiday and a regular day. The device includes a calendar board having day, week and month spaces thereon and a plurality of magnetic date blocks for securing to the day spaces. Each date block includes two discretely-colored numerals on each of two opposing sides, one color numeral for indicating a holiday and the other for indicating a regular day.

U.S. Pat. No. 4,015,351 issued to Sasson discloses a perpetual calendar including a base panel having horizontal grooves formed thereon. Overlaying the grooves is a transparent sheet having notches that are configured to identify a day, a month or a date. Colored tabs within the grooves may be slid beneath a month, day and date notch to conspicuously identify the current date.

U.S. Pat. No. 5,799,423 issued to Malino discloses a magnetic calendar including a panel having multiple spaces formed thereon for depicting a current month and the pertinent dates thereof. A plurality of magnetic pieces having numerals or indicia thereon are positioned within the spaces to correctly depict the current month's calendar.

U.S. Pat. No. 3,827,168 issued to Mori discloses a perpetual calendar having a sheet with transparent characters formed thereon that each correspond to days of the week, dates and the current month. Colored plates are each positioned behind any of the transparent characters to depict the current month, date and day of the week.

U.S. Pat. No. 4,176,478 issued to Brewer discloses a calendar having detachable components for perpetually arranging the calendar. The components are easily stored in a designated compartment.

As indicated above, numerous perpetual calendars exist in the prior art that allow a user to continuously reconfigure the calendar according to the current month or year. However, none of the above-described calendar systems include a means for conveniently monitoring upcoming events; additionally, each of the conventional devices requires substantial reconfiguration in order to update the calendar to reflect a current time frame. The present invention provides a calendar that overcomes the disadvantages of the prior art calendars by providing a calendar formed of multiple magnetic sheets, magnetic week strips and writable magnetic event tabs; the week strips and event tabs are continuously moved between differently configured sheets such that the calendar for the next twelve months is continuously reconfigured and updated.

SUMMARY OF THE INVENTION

The present invention relates to a calendar system comprising multiple (i.e., twelve) magnetic "month" sheets for each calendar month of the year, a magnetic "To Do List" sheet and a magnetic "Six Weeks at a Glance" sheet. Each sheet includes a header section which is selectively variable according to the current month, year and/or day using magnetic date tabs each having a particular month, date or year number imprinted thereon. The system further includes a plurality of magnetic "week" strips for securing to one of the sheets. Each "week" strip includes seven columns each having a day of the week imprinted adjacent thereto. Adjacent each day of the week indicia is a date space to which one of the numbered tabs is secured to appropriately label each day with the corresponding date for the particular week. A plurality of color-coded event tabs are also included for magnetically securing to one of the "week" strips positioned on a "Month" sheet or the "Six Weeks at a Glance" sheet, or directly to the "To Do List" sheet. Each time a week elapses, a "week" strip is moved from the current "Month" sheet to the "Six Weeks at a Glance Sheet." The week strip associated with the elapsed week is moved to a final "Month" sheet and re-labeled accordingly whereby next year's calendar is continuously configured and updated.

It is therefore an object of the present invention to provide a calendar system that eliminates the need to purchase a new calendar each year.

It is another object of the present invention to provide a calendar system that includes color-coded event tabs for grouping certain events according to a common theme.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
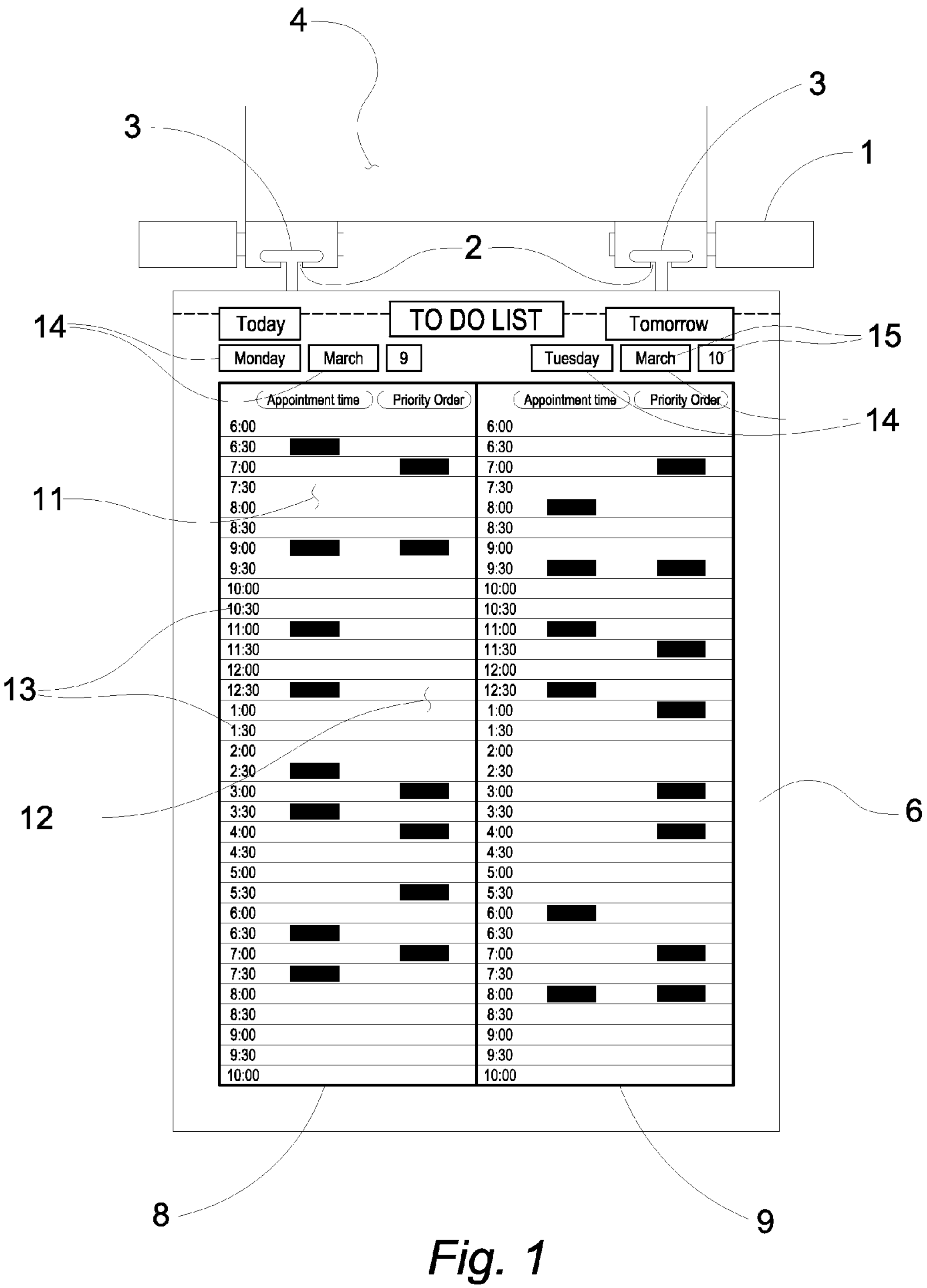
FIG. 1 is a plan view of the "To Do List" sheet.
Figure 2:
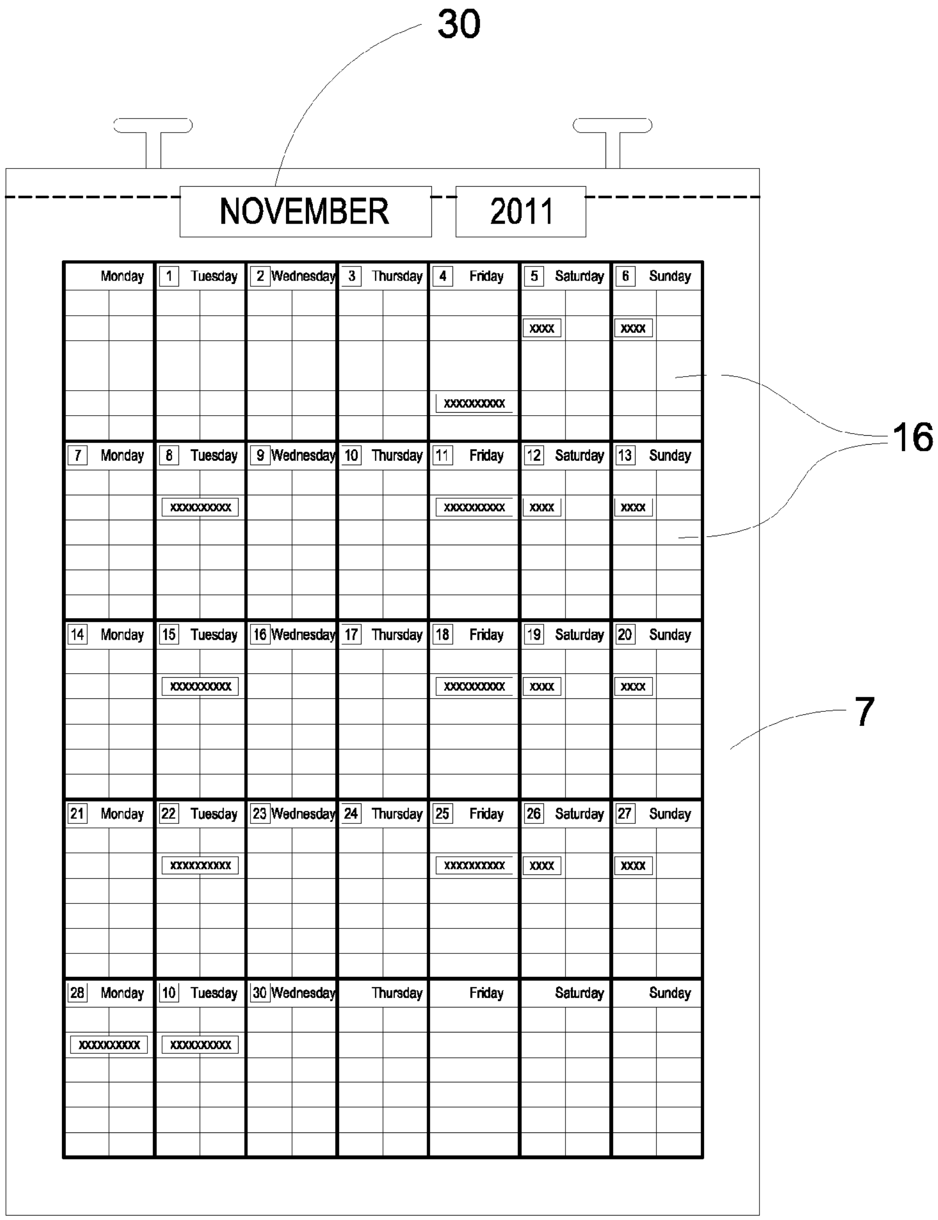
FIG. 2 is a plan view of an exemplary "Month"/"Six Weeks at a Glance" sheet.
Figure 3:
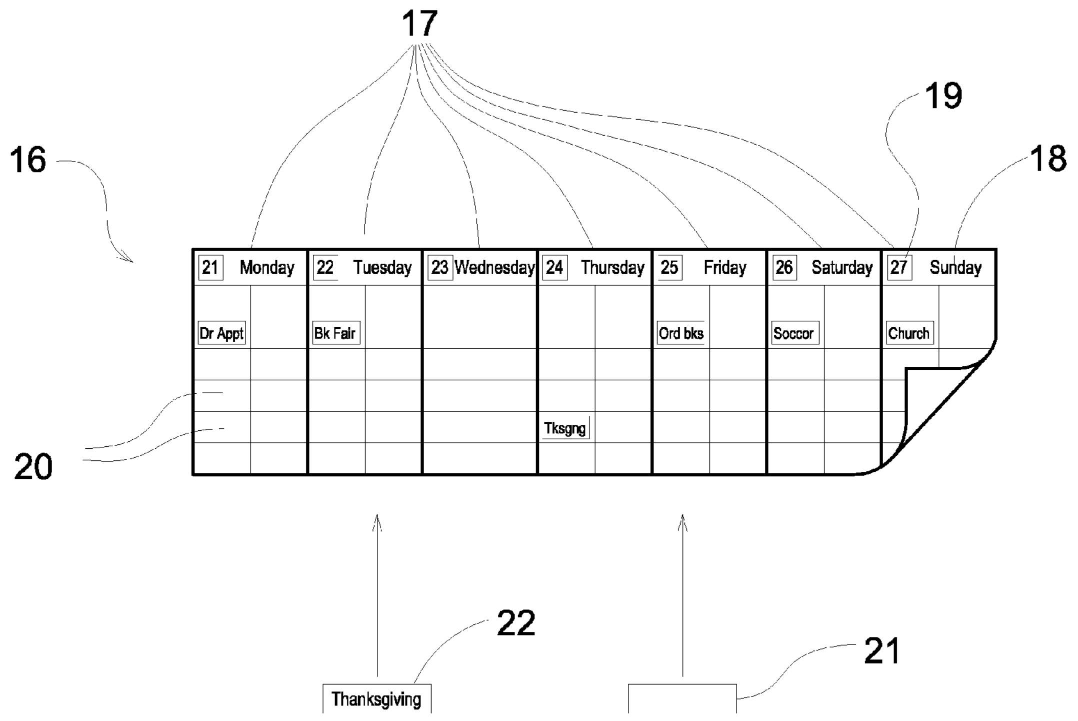
FIG. 3 depicts an exemplary "week" strip and corresponding event tabs.

The present invention relates to a calendar system comprising a plurality of magnetic sheets each for displaying important events for a particular time period. The sheets are supported within a frame 1 that is secured to an underlying support surface such as a wall. The frame includes a pair of slots 2 that receive one of two T-shaped hangers 3 at the upper edge of each sheet. A flap 4 pivots onto the slots to retain the sheets within the support frame. The frame further includes a cavity for storing tabs(described infra), pens and other related supplies.

The calendar includes twelve "Month" sheets 7 for each calendar month of the year, a "To Do List" or task sheet 6 and a "Six Weeks at a Glance" sheet, which is configured identically to any of the month sheets. The "task" sheet includes a pair of columns, one 8 corresponding to Today and another 9 corresponding to Tomorrow. Each column is divided into two sections, one 11 pertaining to the time of day for a scheduled event, the other 12 for arranging events in order of priority. Along the side of the time of day column are time indicia 13 in predetermined intervals, i.e., every thirty minutes. Alternatively, a blank magnetic strip can be secured next to the columns on which a user can write desired time intervals. The task sheet includes a header section 14 which is selectively variable according to the current month and day. As such, the calendar system further includes magnetic date tabs 15 each having a particular month, date or year number imprinted thereon. Accordingly, a user can modify the header section to appropriately depict the identity of the current day, month and date, as well that of the succeeding day.

The "Month" sheets, as with the "To Do List" sheet, each include a variable header 30 for displaying a month and a year. Furthermore, the "Month" sheets also include a rectangular border that defines a blank space for receiving week strips 16 as described in more detail below.

Each "week" strip 16 includes seven columns 17 each having a day of the week indicia 18 imprinted adjacent thereto. Adjacent each day of the week indicia is a date space 19 to which one of the numbered tabs is secured to appropriately label each day with the corresponding date for the particular week. For example, if Wednesday falls on the 23$^{rd}$ of the month for a given week, the number 23 is placed adjacent the designation "Wednesday." Each day column includes multiple blocks 20 to which event tabs are secured as described in more detail below.

A plurality of color-coded event tabs 21 are also included for magnetically securing to a designated time slot and/or date on one of the aforementioned sheets. A permanent marker is used to transcribe recurring events onto some of the tabs while an erasable marker is used to transcribe other rarer events. Alternatively, adhesive labels may be printed and applied to the tabs. A predetermined number of tabs 22 may be preprinted to designate certain annual events or holidays, i.e., Christmas, Thanksgiving, etc.

The method of using the calendar system described above includes first preparing the "Six Weeks at a Glance" sheet to depict the current month by placing six weekly strips thereon. The magnetic month, date and year tabs are secured to the top of the sheet to properly identify the corresponding time period. Magnetic number tabs are placed adjacent each day designation beginning with the current day of the week. The month sheets are then configured starting with the month immediately succeeding the current month being depicted on the "Six Weeks at a Glance" sheet. Again, each sheet is properly identified using the numbered and labeled tabs. An appropriate number of "week" strips are secured to each month according to the number of weeks each calendar month actually contains. The first "month" sheet may only include a few or no "week" strips because some earlier strips will be on the "Six Weeks at a Glance" sheet. The user then labels each writable tab with an identifying transcription corresponding to a known, scheduled event. Any events which are in any way related or similar are preferably transcribed onto matching colored tabs for easier identification. Each of these tabs is magnetically secured to the appropriate month and day of the year on either the "Six Weeks at a Glance" sheet or a "Month" sheet. Any tabs identifying events scheduled for the current day or the immediately succeeding day, are placed on the "To Do List" page according to either its scheduled time or priority. At the end of the day, the user removes the event tabs from the "Today" column and either erases them or places them on another date on any of the other sheets. The event tabs in the Tomorrow column are then relocated to the Today column. All event tabs on the "Six Weeks at a Glance" sheet corresponding to the date immediately succeeding that of the original "Tomorrow" date, are then placed into the "Tomorrow" column on the "To Do List" sheet.

When a week on the "Six Weeks at a Glance" sheet has elapsed, the strip corresponding thereto is removed and placed on the last "Month" sheet. The date numbers are replaced with numbers corresponding to appropriate days of the week for the last month. For example, if the week strip on the "Six Weeks at a Glance" sheet represented the first week of December 2008, the strip may represent the final week of November 2009 once it is relocated to the last "month" sheet. Each remaining strip on the "Six Weeks at a Glance" sheet is moved up one position and the most current "week" strip remaining on the most current "Month" sheet is relocated to the lowermost position on the "Six Weeks at a Glance" sheet. Once all "week" strips have been removed from the most current "Month" sheet, the sheet is placed behind all other "Month" sheets and is configured to appropriately depict the twelfth month that succeeds the current month. "Week" strips from the "Six Weeks at a Glance" sheet are gradually added to the last month sheet whereby the following year's calendar is continuously updated.

The above-described device is not limited to the exact details of construction and enumeration of parts provided herein. Finally, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A calendar system comprising:

a task list sheet having a header section and a pair of columns formed thereon, one of said columns corresponding to a current day, and another of said columns corresponding to a day immediately succeeding said current day;

a current month sheet for displaying scheduled events within a predetermined duration of the current day;

at least one subsequent month sheet, said subsequent month sheet including a header section formed thereon for identifying a particular month and year;

a plurality of week strips removably securable to either of the subsequent month sheet and the current month sheet, each of said week strips having a plurality of day columns, each of said day columns having a day of the week indicium imprinted adjacent thereto and a date space adjacent each day of the week indicium;

a plurality of date tabs removably securable to any of said week strips, said current month sheet, said subsequent month sheet and said task list sheet, each of said date tabs having indicia thereon that discretely identifies either of a specific day of the week, a specific month of the year and a specific date of a month.

2. The calendar system according to claim 1 further comprising a plurality of color-coded event tabs for securing to either of said weeks strips and said task list sheet.

3. The calendar system according to claim 2 wherein said task sheet includes a pair of columns, one of said columns representing a current day of a week and another of said columns representing a day immediately succeeding the current day.

4. The calendar system according to claim 3 wherein each of said columns is divided into a first section for depicting a time of day for a scheduled event, and a second section for depicting a priority of the scheduled event.

5. The calendar system according to claim 4 further comprising time indicia in predetermined intervals adjacent said first column.

6. The calendar system according to claim 2 wherein said event tabs each have indicia thereon, said indicia describing a predetermined event.

7. The calendar system according to claim 1 wherein said task list sheet, said current month sheet and said subsequent month sheet are retained within a frame that is securable to an underlying support surface, said frame including a pair of slots that each receive one of two hangers at an upper edge of each of said sheets, said frame further including a flap pivotal onto the slots to retain the sheets within said support frame.

8. A calendar method comprising the steps of:

providing a plurality of week strips, each of said strips having each day of the week imprinted thereon with a blank space adjacent thereto;

providing a plurality of month sheets each having a blank header section;

providing a task sheet having a pair of columns formed thereon, a first column representing a current day and a second column representing a day immediately succeeding said current day;

providing a plurality of date tabs each having a discrete indicium thereon that identifies any one of a specific month of the year, a specific day of the week and a specific date of the month;

placing a first predetermined number of week strips on a first of said month sheets;

fastening date tabs to the header section of said first of said month sheets to properly identify a current month;

attaching number tabs adjacent each blank space to properly associate each day of a predetermined week with a correct date of a calendar month.

9. The method according to claim 8 further comprising the steps of:

fastening a predetermined number of date tabs to the header section of a second of said month sheets to properly identify a month immediately succeeding the current month being depicted on said first of said month sheets;

attaching a second predetermined number of week strips to said second of said month sheets according to a number of weeks that said month immediately succeeding the current month actually contains.

10. The method according to claim 9 further comprising the steps of:

attaching number tabs adjacent each blank space on said second predetermined number of week strips to properly associate each day of a predetermined week with a date of the month immediately succeeding the current month.

11. The method according to claim 9 further comprising the steps of: providing event tabs each having an identifying transcription thereon corresponding to a known, scheduled event;

securing each of said event tabs to an appropriate month and day of the year on an appropriate week strip positioned on either of the first of said month sheets and the second of said month sheets.

12. The method according to claim 11 further comprising the steps of:

removing one of said first predetermined number of week strips from said first month sheet when a week corresponding thereto elapses;

placing said one of said predetermined number of week strips on said second month sheet;

fastening number tabs on each of said blank spaces to associate said week strip with a calendar week later in a given year.

13. The method according to claim 12 further comprising the steps of:

moving a remaining amount of said first predetermined number of week strips on a first of said month sheets upwardly and placing one of the second predetermined number of week strips on said second of said months sheet below said remaining amount.

14. The method according to claim 13 further comprising the steps of:

moving event tabs from said first of said month sheets to the second column of said task list sheet upon a current day elapsing;

moving event tabs from said second column to said first column upon the current day elapsing.

* * * * *